United States Patent [19]
Brewster

[11] 3,727,586
[45] Apr. 17, 1973

[54] LIVESTOCK OILER

[76] Inventor: Donald H. Brewster, 405 South Main Street, Sheridan, Wyo. 82801

[22] Filed: Mar. 3, 1971

[21] Appl. No.: 120,395

[52] U.S. Cl. ............................... 119/157, 222/518
[51] Int. Cl. ...................... A01k 29/00, A61d 11/00
[58] Field of Search .................. 119/80, 157, 159; 222/518, 559

[56] References Cited

UNITED STATES PATENTS

| | | | |
|---|---|---|---|
| 2,988,051 | 6/1961 | Minock | 119/157 |
| 3,203,400 | 8/1965 | Hesse | 119/157 |
| 1,216,081 | 2/1917 | Cox | 119/157 |
| 1,828,104 | 10/1931 | Divekey | 119/80 X |
| 2,988,050 | 6/1961 | Minock | 119/157 |
| 3,055,340 | 9/1962 | Davis | 119/157 |
| 3,561,650 | 2/1971 | Brand | 222/518 |

*Primary Examiner*—Louis G. Mancene
*Assistant Examiner*—James H. Czerwonky
*Attorney*—Hill, Sherman, Meroni, Gross & Simpson

[57] ABSTRACT

A livestock oiler built in the shape of a saw-horse can be assembled from ordinary metal pipe, bars and plate. Dual plunger valves mounted in the legs of the oiler open when rubbed against by livestock, allowing insecticide or other mendicament to flow by gravity from a receptacle mounted at the top of the oiler into the hollow pipe legs and out through the valves. The oiler is simple and economical to construct. Pairs of these outwardly, spring-biased valves are mounted in opposite ends of sleeves which pass completely through the pipe legs. The valves have an elongated slot passing transversely therethrough, and the sleeves have transverse openings in each end to receive a pin. The pin cooperates with the associated plunger valve slot to limit the outward movement of the plunger valve.

4 Claims, 4 Drawing Figures

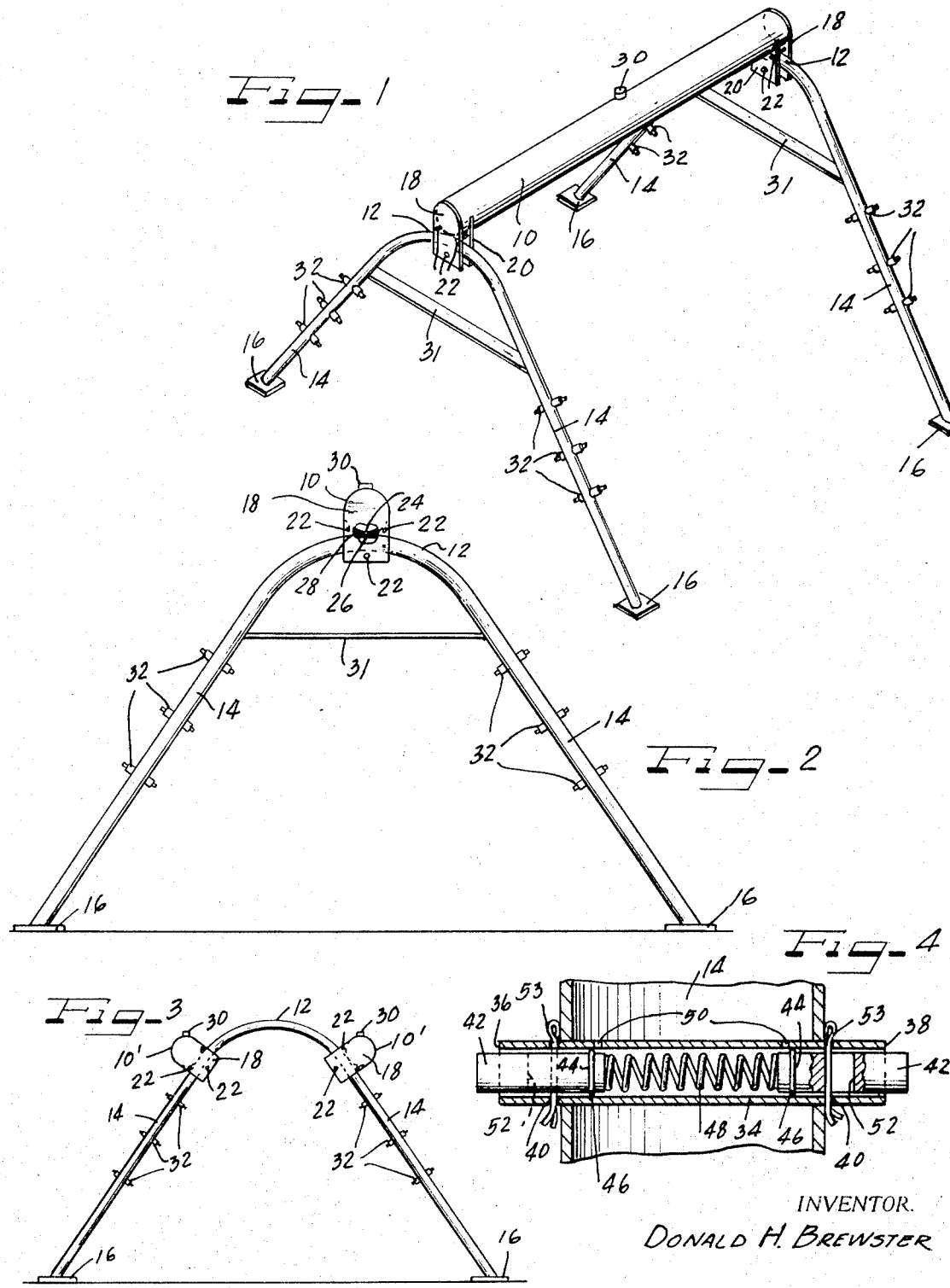

LIVESTOCK OILER

SUMMARY OF THE INVENTION

Oilers for applying insecticide and other liquid materials to animals are well known as shown by U. S. Pat. Nos. 3,229,668, 3,055,340, 3,239,192 and 2,988,050.

The object of the invention is to provide a simple and economical livestock oiler which can be shipped disassembled and easily assembled at the situs of use.

Another object of the invention is to provide a livestock oiler of rugged construction which has a high degree of stability.

A still further object of the invention is to provide a livestock oiler capable of servicing animals of different heights and sizes.

Still another object of the invention is to provide a livestock oiler which will remain upright in service without being anchored to a foundation.

Other objects of the invention will be apparent from the following description and drawings.

BRIEF DESCRIPTION OF THE DRAWINGS

FIG. 1 is an isometric view of an oiler constructed in accordance with the invention.

FIG. 2 is a vertical end view of the oiler shown in FIG. 1.

FIG. 3 is a vertical end view of another modification of the oiler.

FIG. 4 is an enlarged view partially in cross section of a valve structure forming part of the oiler.

DETAILED DESCRIPTION OF THE INVENTION

Referring to the drawings, the numeral 10 indicates an elongated, horizontal receptacle supported on the bends 12 of a pair of pipe legs 14. Pipe legs 14 are formed by bending a straight piece of hollow pipe into the general shape of a "V" except that the narrow end of the "V" is curved instead of pointed in order to provide a continuous, unobstructed passageway through the pipe. The legs 14 may be formed of pipe having a 2 inches inside diameter, and the receptacle 10 may be formed of pipe having a 6 inches inside diameter. It will be understood, however, that pipe of smaller or larger size may be used without departing from the invention. The pipe is preferably steel but may be made of any suitable material such as aluminum or plastic.

In forming the legs 14, I prefer to use a pipe length such that when bent, the ends are a distance apart of approximately 7 feet, and the height from the ends of the pipe to the top of the bend is approximately 4 feet. The receptacle will be approximately 6 feet long.

Steel or other metal or plastic plates 16 are welded or otherwise fastened to the bottom ends of the pipe 14 in order to close the ends and form a stable base. The plates are preferably of sufficient area to prevent the oiler from being toppled over when contacted by livestock. If preferred, however, the plates 16 can be anchored to a foundation, for example, by being bolted to concrete piles.

Receptacle 10 is fastened to the legs 14 by means of outer plates 18 and inner plates 20. The plates 18 are welded to each end of the receptacle 10 in order to form a liquid tight closure. The upper part of the plate is preferably rounded to conform to the shape of the end of the receptacle. The lower end of the plate 18 extends a short distance below the bend 12 of the pipe 14. The plates 20 extend downwardly on the inner side of the legs 14 and are welded to the inner side of the pipe bends 12. The upper edge of the plates 20 are cut to conform to the shape of the underside of the receptacle 10, and the bottom edge of the plate generally conforms in shape and extent to that of the plate 18. Suitable holes are drilled through the plates so that they can be fastened to each other by means of bolts 22. It will be apparent that the legs 14 and receptacle 10 can be shipped in disassembled form and readily assembled by merely mounting the receptacle 10 on the plates 20 and bolting the pairs of plates 18 and 20 together on the opposite sides of the two legs.

A hole 24 is drilled through each end of the receptacle 10 on the bottom side immediately above the bends 12 and a hole 26 is drilled at the top of the bend 12 of each pipe in alignment with the hole 24 so that there is an open passageway from the receptacle 10 into the pipes 14. The joint between the receptacle 10 and the bend 12 around the openings 24 and 26 is sealed by an O-ring or other suitable sealing means to prevent leakage. A filler opening closed by plug 30 is provided at the top of the receptacle 10 in order to fill the receptacle with insecticide or other desired liquid material. The plug 30 may be threaded into an opening at the top of the receptacle or may merely be a friction-fitted plug made of a nylon or oil-resistant elastomeric material such as neoprene or acrylonitrile copolymers.

A brace 31 formed of bar stock, pipe or angle, is preferably welded between the two legs of the pipe 14 near the upper end or bend in order to stabilize the legs and prevent the legs from spreading or being compressed together when pressure is exerted against them by livestock.

Mounted at spaced intervals along the legs 14 are valves 32. The structure of the valves is more clearly shown in FIG. 4. The valves are formed with a sleeve 34 which is mounted in oppositely drilled holes in the pipe legs 14 and welded or otherwise fastened and sealed to the pipe to prevent leakage around the sleeve. The sleeves 34 may be formed of ⅝ inch inside diameter pipe and of material the same as or different from that of pipes 14. Sleeve 34 extends outwardly of the pipe 14 at both ends 36 and 38. The sleeve 34 has a small hole 40 drilled therethrough adjacent both ends so that when the sleeve is welded to pipe 14, the holes 40 will be positioned outside the pipe. Mounted in each end of the sleeve 14 is a plunger 42 made of brass, nylon or other suitable material. The plunger 40 is adapted to slide loosely within the sleeve so that liquid can pass between inch plunger and sleeve. Each plunger is formed near its inner end with a peripheral groove 44 in which is mounted an O-ring 46 to form a seal between the inner surface of the sleeve and the plunger. A coil spring 48 or other resilient member is mounted in the sleeve 34 between the two plungers. The spring is normally under compression in order to bias the plungers outwardly into closed position. Spaced passageways 50 are drilled or otherwise formed through the wall of sleeve 34 in a position such that the passageway is inward of the adjacent O-ring 46 when the plungers are in their maximum outward position, thereby preventing liquid from flowing from pipe 14 through the passageway 50 and out between the plunger and the sleeve.

Each of the plungers 42 is formed with a slot 52 through which a pin 53 can pass when inserted through the holes 40 of the sleeve. A cotter pin or any other suitable pin can be inserted through the holes 40 and slots 52 and act to limit the stroke of the plunger 42. The pin 53 may be of sufficient size to substantially seal the holes 40 as shown in the right-hand side of FIG. 4. Any leakage past the pin is inconsequential and will flow along the legs 14 and be applied to the cattle rubbing thereagainst. The slots 52 are of sufficient width to enable the plunger 42 to be forced outwardly by spring 48 until the O-rings 46 are positioned outwardly of the openings 50, thereby preventing flow of fluids outwardly through the valves; and to allow the plungers to be pressed inwardly a sufficient distance so that the O-rings move inwardly of the openings 50, thereby allowing fluid to flow through the openings outwardly between the sleeve and the plungers. The ends of the plungers extend outwardly of the ends 36 and 38 of the sleeve a sufficient distance so that they can be pressed inwardly to open the valve and allow the flow of liquid.

Referring to FIG. 3, there is shown a modification in which two receptacles 10' are mounted adjacent the top of legs 14 on the downward slope of the bend 12. Where two receptacles are used, they may be made of 4 inches inside diameter pipe. The receptacles 10' are mounted on the pipe 14 in the same manner described in connection with receptacle 10. By providing two receptacles on the downward slope of the bend, the danger of clogging occurring at the top of the bend is avoided and flow of liquid to both legs is assured.

While I have shown and described a coil spring for biasing the valve plunger, other biasing means may be used such as, for example, an elastomeric plug mounted in the sleeve. By using an elastomeric plug which fits snugly within the sleeve and extends a sufficient distance to normally close the passageways 50, the necessity for grooving the plungers and fitting them with O-rings can be eliminated. It will be apparent, however, that a loosely mounted elastomeric element can be substituted for the coil spring and the structure of the valve remain otherwise the same.

Although I have shown three valves mounted on each leg of the pipe 14 extending in a direction generally parallel to that of the plane in which each pair of legs lie, it will be understood that more or less than three valves may be mounted at appropriate locations on the legs, and that the valves may be mounted in different directions. For example, alternate valves may be mounted at 90° to each other so that an animal will contact the valve regardless of which direction an animal approaches or passes through the saw-horse structure or rubs along the outer or inner sides of the legs.

By placing the legs at a sufficiently wide angle to allow an animal to pass therebetween, the animal can rub both its upper and lower body areas against the protruding valve plungers.

What I claim is:

1. A livestock oiler comprising a pair of spaced pipes, each bent in the general form of an inverted V and having an upwardly curved peaked portion having a fluid passageway leading thereinto at the apex of said peaked portion, at least one elongated receptacle extending between said pair of pipes and over the apices of the peaked portions thereof, means closing the ends of said receptacle, other means engaging said means closing the ends of said receptacle for retaining said receptacle to said pipes and said legs in spaced relation with respect to each other, liquid passageways from opposite ends of said fluid receptacle having communication with said passageways leading into said pipes at the apices of the peaked portions thereof, means accommodating the filling of said receptacle with liquid, a plurality of sleeves spaced along said pipes, said sleeves having a length greater than the width of said pipes and extending completely therethrough to project forwardly and rearwardly therefrom, fluid passageways from said pipes to said sleeves, a separate valve in each end of each sleeve, a single spring biasing said valves in extended relation with respect to said sleeves, means to close said sleeves from the passage of liquid through the ends thereof, and means limiting outward movement of said valves into closed positions, said outward movement limiting means comprising an elongated slot passing transversely through each of said plungers and a pin extending diametrically through transverse openings in each end of each sleeve and through the slot of the associated plunger, said valves being openable to accommodate the passage of liquid thereby by pressure thereagainst by livestock and the like.

2. The livestock oiler of claim 1,
    wherein the means closing the ends of said receptacle comprise plates extending along the outsides of said pipes and depending from the peaked portions thereof,
    wherein the means fastening said receptacle to said pipes comprise other plates spaced parallel to said end plates depending from said receptacle along the insides of said pipes,
    and fastening means clamping said closure plates and inner plates to the associated pipes.

3. The livestock oiler of claim 1, in which each valve comprises a plunger slidably guided in said sleeve, and wherein said closing means comprises an O-ring extending about said plunger adjacent the inner end thereof, and spaced outwardly of the associated passageway within said sleeve when said plunger is in extended relation with respect to said sleeve.

4. The livestock oiler of claim 3,
    wherein the inner ends of said plungers form spring seats and the biasing means comprises a single compression spring seated on said seats of opposed plungers.

* * * * *